United States Patent
Ryan et al.

[11] Patent Number: 5,442,931
[45] Date of Patent: Aug. 22, 1995

[54] SIMPLIFIED ADSORPTION HEAT PUMP USING PASSIVE HEAT RECUPERATION

[75] Inventors: William Ryan, Chicago; William M. Worek, Downers Grove; Weixiang Zheng, Darien, all of Ill.

[73] Assignee: Gas Research Institute, Chicago, Ill.

[21] Appl. No.: 284,895

[22] Filed: Aug. 2, 1994

[51] Int. Cl.⁶ .............................................. F25B 17/08
[52] U.S. Cl. ....................................... 62/101; 62/480; 62/324.2; 165/104.12
[58] Field of Search ................. 62/101, 477, 480, 476, 62/324.2, 149, 77; 165/1, 2, 58, 61, 97, 104.12, 132

[56] References Cited

U.S. PATENT DOCUMENTS

| | | | |
|---|---|---|---|
| 3,935,102 | 1/1976 | Swearingen | 165/1 |
| 4,184,338 | 1/1980 | Bennett | 62/480 X |
| 4,448,030 | 5/1984 | Moss | 62/79 |
| 4,509,337 | 4/1985 | Wiart et al. | 62/235.1 |
| 4,594,856 | 6/1986 | Rothmeyer | 62/112 |
| 4,637,218 | 1/1987 | Tchernev | 62/106 |
| 4,742,868 | 5/1988 | Mitani et al. | 165/104.12 |
| 4,754,805 | 7/1988 | Rothmeyer | 165/1 |
| 5,005,371 | 4/1991 | Yonezawa et al. | 62/238 |
| 5,024,064 | 6/1991 | Yonezawa et al. | 62/106 |
| 5,025,635 | 6/1991 | Rockenfeller et al. | 62/114 |
| 5,161,389 | 11/1992 | Rockenfeller et al. | 62/480 |
| 5,237,839 | 8/1993 | Dehne | 62/476 |
| 5,241,831 | 9/1993 | Rockenfeller et al. | 62/102 |
| 5,263,330 | 11/1993 | Rockenfeller et al. | 62/102 |
| 5,272,891 | 12/1993 | Erickson | 62/477 |
| 5,347,815 | 9/1994 | Jones | 62/46.2 |

FOREIGN PATENT DOCUMENTS 1332119  8/1987  U.S.S.R. ............................. 62/101

*Primary Examiner*—Henry A. Bennett
*Assistant Examiner*—William C. Doerrler
*Attorney, Agent, or Firm*—Dick and Harris

[57] ABSTRACT

A heat pump system utilizing a simplified configuration having a single adsorbent reactor structure is disclosed. In a preferred embodiment, a carbon-ammonia adsorbent-reactant combination is employed. Heating and cooling of the reactor is accomplished directly by heating and cooling of the ammonia.

9 Claims, 3 Drawing Sheets

SIMPLIFIED ADSORPTION HEAT PUMP USING PASSIVE HEAT RECUPERATION

BACKGROUND OF THE INVENTION

1. Field of the Invention

The present invention relates to the field of heat pumps and methods of operation of same. In particular, the present invention relates to heat pumps which employ as part of their cycle the adsorption and desorption of a fluid, such as ammonia.

2. The Prior Art

Adsorption heat pumps operate on the principle that certain materials which are contained in a reactor (reactor materials), are capable, at certain temperatures and pressures, of adsorbing other materials (reactant materials), in a reaction which gives off heat. These same reactor materials are also capable of desorbing the reactant materials, when heated sufficiently. The reactor is connected in a circuit with a condenser and an evaporator. The heat exchange properties of the reactor material can be taken advantage of in heat exchangers, thermally connected to the evaporator and condenser, in which one or more working fluids exchange heat with the reactant materials. The working fluids, in turn can be employed in compression/condensation - expansion/evaporation systems for heating and/or cooling a residence, for example.

Single reactor materials in an adsorption heat pump are typically solids, but may also be liquids (e.g., Dehne, U.S. Pat. No. 5,237,839). A common reactor material is the substance known as zeolite, which may either be natural or artificially made. The reactant materials are typically fluids, which may undergo a phase change from liquid to vapor, to liquid again, during the operating cycle of the pump. Water is often used as the reactant with a zeolite reactor material, or ammonia is used as the reactant with an activated carbon reactor material.

Typical prior art adsorption heat pump systems utilize two reactors, such that as one reactor is adsorbing reactant, the other is in the process of desorbing reactant. Other prior art systems may have more than two reactors, each in a phase of the reaction cycle separate from the phases of the other reactors. Such systems have been used in an attempt to provide a more or less continuous supply of heating or cooling, or in some applications, simultaneous heating to one location and cooling to another location.

Rothmeyer, U.S. Pat. No. 4,594,856; Tchernev, U.S. Pat. No. 4,637,218; Rothmeyer, U.S. Pat. No. 4,754,805; Yonezawa et al., U.S. Pat. No. 5,024,064; Rockenfeller, U.S. Pat. Nos. 5,025,635, 5,161,389, 5,241,831, and 5,263,330, all show examples of two (or more) reactor systems. However, two reactor systems may have the potential drawback that the heating and cooling of the reactors, using a heat transfer fluid, may tend to require large heat transfer surfaces.

One reactor systems are known in the prior art, and are typically used for so-called thermal storage. That is, heat or power is used to drive an adsorption or desorption process, and the heat which is given off or taken in is later released for the dedicated heating or cooling, only, of a space. Such a system is disclosed in Mitani et al., U.S. Pat. No. 4,742,868. A single reactor system which is capable of simultaneous heating and cooling is disclosed in Yonezawa et al., U.S. Pat. No. 5,005,371. Single reactors which use a heat transfer fluid also require large heat transfer surfaces.

It is desirable therefore to provide a heat pump configuration which has an improved method of heating the reactor which does not require large heat transfer surfaces.

It is also desirable to provide a heat pump configuration which uses only a single reactor, which could have the effect of improving cycle efficiency.

SUMMARY OF THE DISCLOSURE

The present invention is a heat pump system for transferring heat to and/or from a location, comprising a first fluid circuit including an adsorbent reactor operably configured to permit the passage of fluid therethrough. The at least one adsorbent reactor having a first end and a second end, the adsorbent reactor further containing therewithin an adsorbent material, a quantity of fluid which is capable of being adsorbed and desorbed by the adsorbent material in the at least one adsorbent reactor, the fluid further being capable of undergoing transition from a vapor phase, to a liquid phase, and from a liquid phase to a vapor phase, in the heat pump system, means for receiving and storing heat from the fluid, and later releasing the stored heat back to the fluid, the means for receiving and storing heat being chemically nonreactive relative to the fluid, and operably configured to permit the passage of fluid therethrough, the means for receiving and storing heat having a first end and a second end, and means for selectively heating the fluid in the first fluid circuit, operably positioned in the first fluid circuit between the first end of the at least one adsorbent reactor, and the second end of the means for receiving and storing heat. The invention also includes means for reversibly propelling the fluid through the first fluid circuit.

A second fluid circuit includes means for condensing the fluid from a vapor phase to a liquid phase, means for receiving the condensed fluid, operably communicating with the means for condensing the fluid, means for evaporating the condensed fluid, from a liquid phase to a vapor phase, operably communicating with the means for receiving the condensed fluid; means for selectively enabling fluid communication between the first and second fluid circuits, such that when the first fluid circuit attains a pressure less than a predetermined amount, the means for selectively enabling fluid communication permits an amount of fluid vapor to be released from the second fluid circuit to the first fluid circuit, causing liquid fluid in the means for receiving the condensed fluid to change phase to vapor, enabling the second fluid circuit to absorb heat, and when the first fluid circuit attains a pressure greater than a predetermined amount, the means for selectively enabling fluid communication permits an amount of fluid vapor to be released from the first fluid circuit to the second fluid circuit, causing fluid vapor in the means for condensing fluid to change phase to liquid, enabling the second fluid circuit to release heat.

The heat pump system is operably configured such that the fluid in the first circuit is maintained continuously in a vapor phase.

In a preferred embodiment of the invention, the fluid in the first circuit is the same as the fluid in the second circuit.

It is contemplated that the first fluid circuit further comprises means for selectively cooling the fluid, operably disposed between the second end of the adsorbent reactor and the first end of the means for receiving and storing heat.

Alternatively, the heat pump system includes means for delivering a quantity of fluid from the means for receiving fluid in the second fluid circuit and delivering the quantity of fluid to the first fluid circuit at a position between the second end of the adsorbent reactor and the first end of the means for receiving and storing heat.

In another alternative embodiment of the invention, the second fluid circuit further comprises a third heat-exchanging fluid circuit operably disposed in thermal communication with, but in fluid isolation from, at least one of the means for condensing the fluid and means for evaporating the condensed fluid. In one embodiment, the fluid in the third heat-exchanging fluid circuit is water and the third heat-exchanging fluid circuit is operably configured to directly heat or cool an occupied space. Alternatively, the fluid in the third heat-exchanging fluid system is a high-performance refrigerant, such as Freon, and the third heat-exchanging fluid circuit is operably configured to directly cool an occupied space.

BEST MODE FOR CARRYING-OUT THE INVENTION

Figure 1:
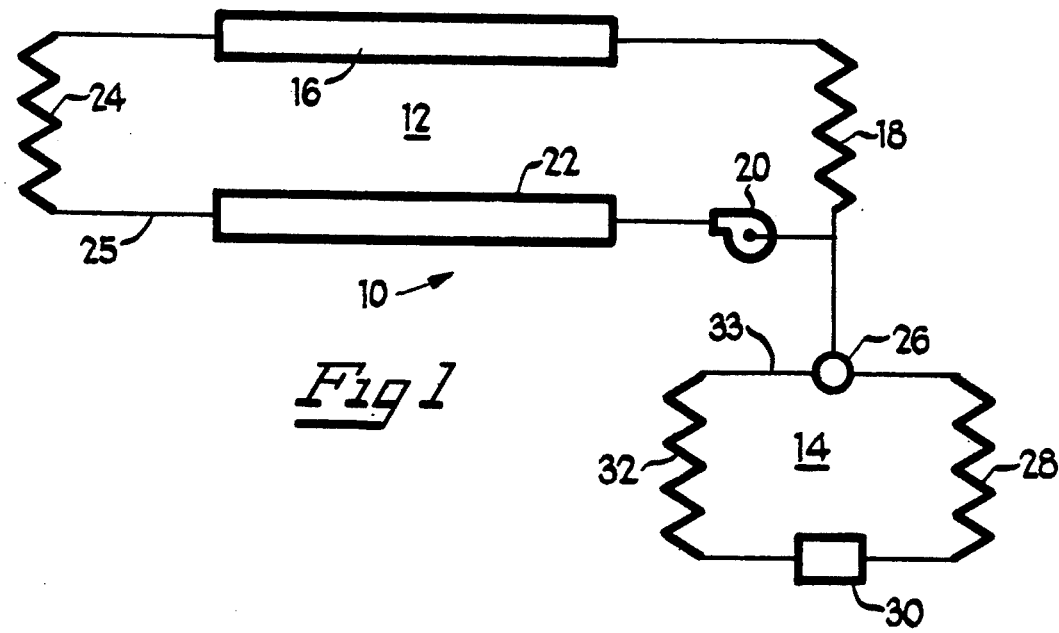
FIG. 1 is a schematic diagram of the heat pump system according to one embodiment of the present invention.

While the present invention is susceptible of embodiment in many different forms, there is shown in the drawings and will be described in detail herein, several specific embodiments, with the understanding that the present disclosure is to be considered as an exemplification of the principles of the invention, and is not intended to limit the invention to the embodiments described.

FIG. 1 shows a schematic drawing of one embodiment of the invention, representing the simplest form of the heat pump. Heat pump 10 includes a first fluid circuit 12 and a second fluid circuit 14. First fluid circuit 12 is formed of an adsorbent reactor 16 (see FIG. 5 and associated text), ammonia cooler 18, ammonia blower 20, regenerator 22, and ammonia heater 24, all connected by suitable insulated conduit 25. Adsorbent reactor 16, in the preferred embodiment of the invention, is filled with carbon particles, which are capable of adsorbing ammonia vapor and giving off heat in the process, and giving off ammonia vapor (desorption) when heated sufficiently. Second fluid circuit 14 includes a three-way check valve 26, condenser 28, liquid ammonia receiver 30, and evaporator 32, again, all connected by suitable conduit 33.

The adsorption/desorption cycle of heat pump 10 is as follows. Presuming that at the beginning of the cycle, the carbon in adsorbent reactor 16 is saturated with ammonia, ammonia heater 24 is turned on, and ammonia blower 20 begins to circulate heated ammonia vapor around the first fluid circuit, in a clockwise direction, relative to the observer of FIG. 1.

Blower 20 must be suitably configured so as to adequately propel the ammonia vapor, in a wide temperature range, in an oil-free and leak-tight manner, so as not to contaminate the adsorbent. Such blowers, which may include magnetically driven rotors, are known in the prior art and are suitable for such applications. Ammonia heater 24 may typically comprise some form of natural gas or methane burner. Ammonia cooler 18 is inactive or bypassed during this portion of the cycle. When the temperature of the ammonia vapor reaches the desorption temperature, the carbon particles in the reactor 16 begin to desorb ammonia vapor. The carbon particles are heated in a thermal wave moving from left to right, as illustrated in FIG. 1.

As ammonia is desorbed into vapor, the pressure within first fluid circuit 12 rises, until, at a predetermined pressure check valve 26 opens, permitting some of the vapor in first fluid circuit 12 to escape into condenser 28, where the vapor condenses into liquid ammonia, and is collected in ammonia receiver 30. Typically, condenser 28 will be air cooled, though other known methods of cooling might alternatively be employed.

Heating of the ammonia vapor continues until all the ammonia has been desorbed from the carbon particles in reactor 16. When the thermal wave has crossed reactor 16 to its leftmost end, and a specific predetermined temperature has been reached, as may be detected by sensors of known design, then all or substantially all of the ammonia which was adsorbed may be presumed to have been desorbed.

Once the carbon has desorbed the ammonia, the ammonia heater is turned off and the air-cooled ammonia cooler begins to cool the ammonia vapor circulating around first fluid circuit 12. Blower 20 is reversed, and the carbon begins to shed heat to the ammonia vapor. As the reactor 16 begins to cool, it begins to reabsorb the ammonia, releasing further heat.

The heated ammonia vapor passes through the heater 24, which is now turned off, and reaches the regenerator 22. The regenerator, in a preferred embodiment of the invention, comprises a tube filled with stainless steel wool, steel shot, or even sand. Other materials may also be used, so long as they are not chemically reactive relative to ammonia, resistant to substantial heat, and are capable of absorbing and releasing heat, relatively quickly, for a large number of cycles. Effectively, by blowing the heated ammonia vapor through the regenerator 22, the thermal wave created in the reactor 16 is moved to the regenerator 22.

As the ammonia vapor in first fluid circuit 12 cools, the pressure in the first fluid circuit 12 drops, until such point as check valve 26 opens. The pressure in second fluid circuit 14 drops, and ammonia liquid from receiver 30 which has flowed to or has been directed to, evaporator 32, boils, releasing ammonia vapor from second fluid circuit 14 into first fluid circuit 12, restoring the ammonia vapor pressure in that circuit. The boiling of ammonia in evaporator 32 provides a cooling effect at that location, which may be advantageously used, as described hereinafter.

Once the carbon in the reactor 16 is fully saturated with ammonia, which may again be determined by the attainment of a predetermined low temperature, by suitably located temperature sensors, then the ammonia cooler 18 is turned off, heater 24 is reactivated, and blower 20 is reversed. However, during this subsequent half-cycle, regenerator 22 already contains some of the heat of adsorption from the preceding half-cycle, and so the heat required to obtain desorption is lessened. In addition, the time required for each adsorption half-cycle is reduced, due to the storage of heat by the regenerator 22.

In this embodiment, the ammonia in the first fluid circuit 12 remains vapor at all times, while the total mass of ammonia in the overall system 10 remains constant.

Control of the various blowers, valves, heaters, coolers, and management of the temperature sensors can be done by a suitably programmed control device (not shown) which may be of known design.

Figure 2:
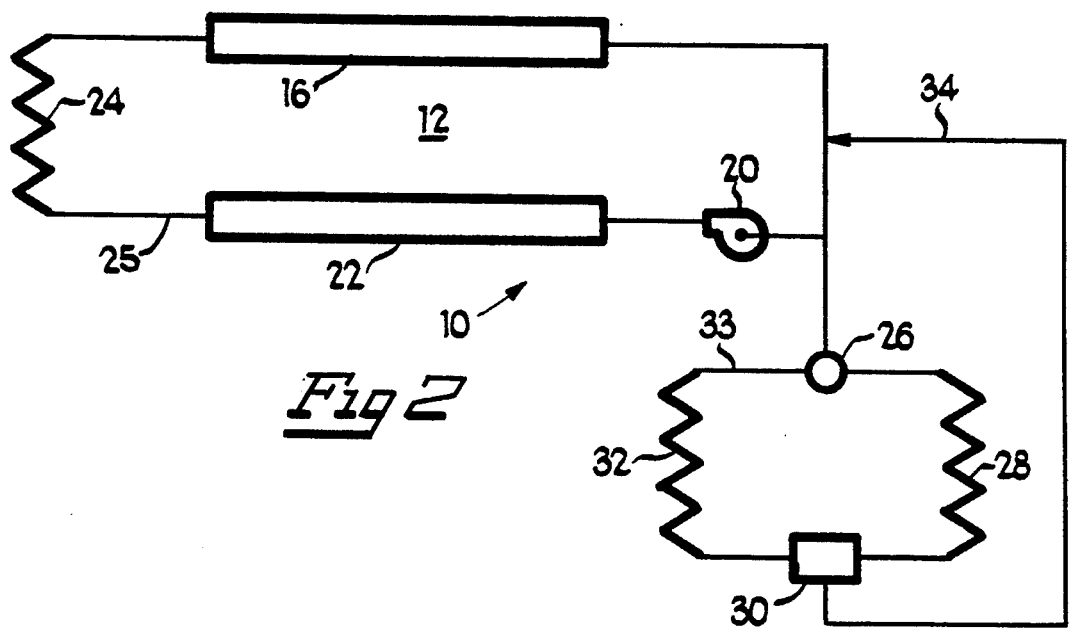
FIG. 2 is a schematic diagram of the heat pump system according to another embodiment of the present invention.

An alternative embodiment is shown in FIG. 2, wherein elements having the same or similar configuration and/or function as elements in the first embodiment are identified with the same reference numbers. In this embodiment, the cooler present in the first fluid circuit has been omitted. Instead, a fluid connection 34 leads from receiver 30 to a point on the first fluid circuit between reactor 16 and regenerator 22. The pressure, necessary to open check valve 26, to take vapor into the second fluid circuit 14, is raised so that more vapor is taken in and condensed. During the adsorption phase, hot ammonia vapor is being blown counterclockwise from the reactor 16 to the regenerator 22. Liquid ammonia is released from the receiver 30 into the flow of hot ammonia vapor. The liquid ammonia flashes to vapor, providing considerable cooling effect to the hot ammonia vapor flow. The other portions of the adsorption/desorption cycle are the same as with regard to the first embodiment of FIG. 1.

Figure 3:
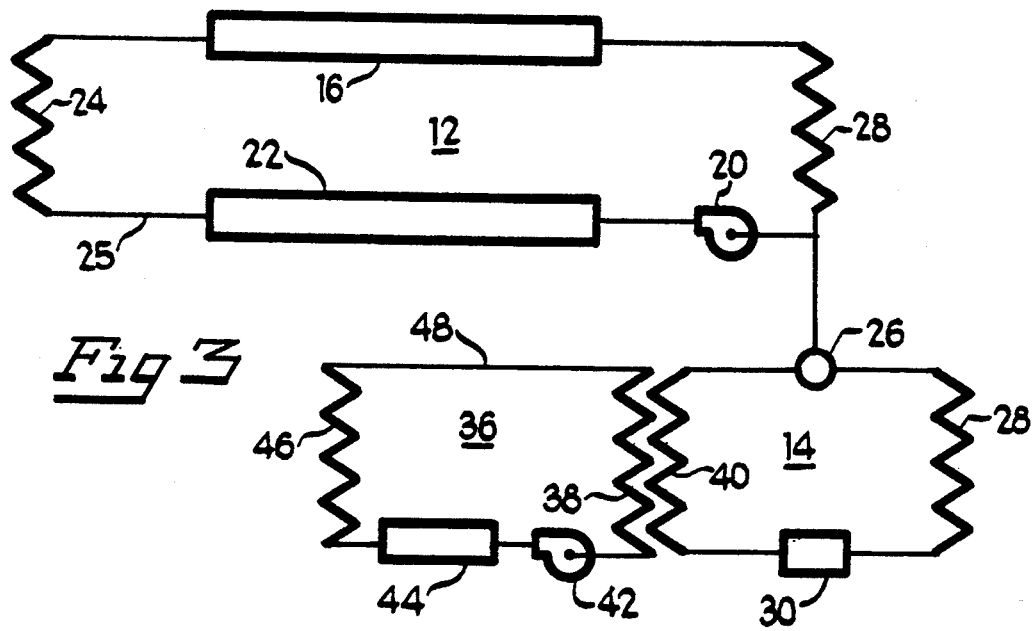
FIG. 3 is a schematic diagram of the heat pump system according to another embodiment of the present invention.

FIG. 3, in which elements having the same or similar configuration and/or function as elements in the first embodiment are identified with the same reference numbers, shows an embodiment of the invention, which has been modified to incorporate a hydronic circuit, thermally connected to one side of the second fluid circuit 14, for providing heating/cooling for an occupied space. According to most local regulations and building codes, ammonia cannot be used as the working fluid for directly cooling any occupied space. The terms "evaporator" and "condenser" are omitted from this embodiment, as well as the embodiment of FIG. 4, inasmuch as three way valve 26 is configured to permit ammonia flow both clockwise and counterclockwise in second circuit 14, so that either side of the second fluid circuit 14, of FIG. 3, can serve that function.

Hydronic circuit 36 includes coil 38, which is in thermal contact with second circuit portion 40, pump 42, storage tank 44, indoor coil 46, and return circuit 48. Second circuit 14 includes an outdoor (air-cooled) coil, and an ammonia receiver 30, as in previous embodiments.

If water is used as the working fluid in circuit 36, then, depending upon the direction of ammonia flow in second circuit 14, then system 10 will function as either a heat pump or a cooling system. Since heating or cooling occurs only during one-half of the cycle, the system should be sized to double that which would be ordinarily deemed necessary for a given application. In order for the heating or cooling capacity to be distributed throughout the operating cycle, a storage tank 44 would be provided, as a reservoir for the heated or chilled water.

System 10, for an average sized home, would be expected to have short cycle times of approximately 2–3 minutes, therefore the size of storage tank 44 can be kept down to reasonable and commercially practical dimensions.

Figure 4:
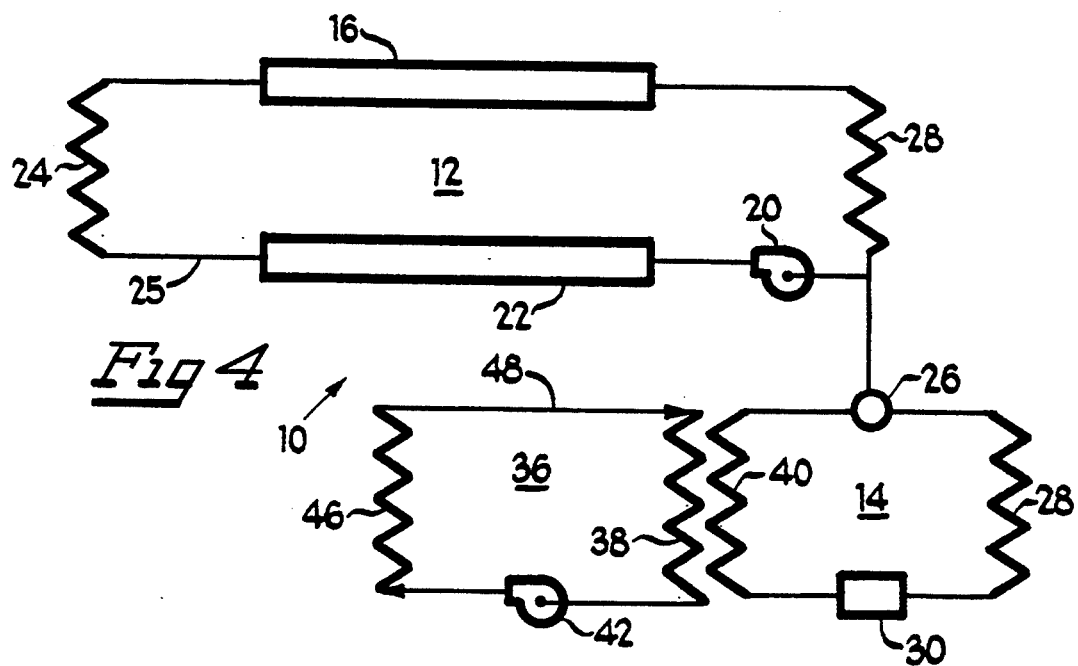
FIG. 4 is a schematic diagram of the heat pump system according to another embodiment of the present invention.

Freon pump 42 may or may not be required in circuit 36, depending upon the specific cooling application. For example, if the coil portion which would be used for evaporation is physically located below the condenser portion of the coil, then recirculation of the Freon would occur naturally without pumping. Accordingly, a system such as illustrated in FIG. 4 would be appropriate for rooftop applications. Alternatively, since no large Freon receiver is required, a small pump could be employed, together with a small supply of stored Freon, in a window or through-the-wall unit.

Figure 5:
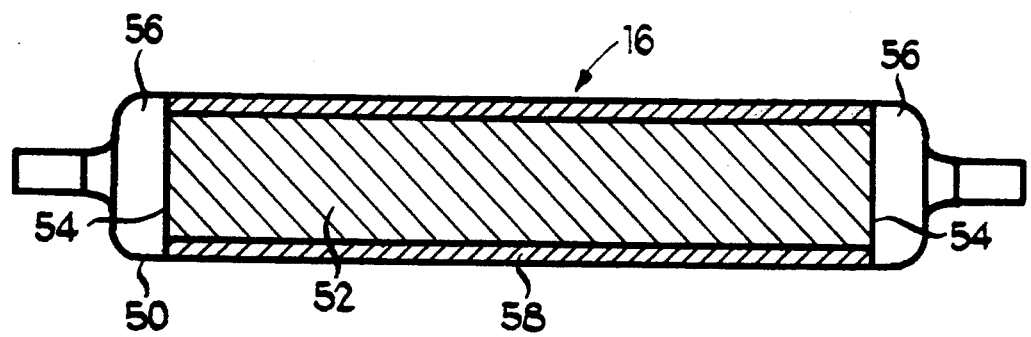
FIG. 5 is a side elevation, in section, of a schematic representation of an adsorbent reactor, in accordance with the present invention.

FIG. 5 illustrates a typical configuration for adsorbent reactor 16. A simple hollow cylinder 50 will be filled with loosely packed activated carbon particles 52. Containment devices 54 may be fine mesh steel screening, or other suitable material, so long as they are gas porous, do not allow the carbon particles to leave reactor 16, and further do not react with the ammonia vapor. The containment devices 54 should be positioned so as to leave space at each end of cylinder 50 to provide plenums 56 to enable the ammonia vapors to spread as widely as possible across the faces of containment devices 54. In this way, more of the carbon will be exposed to the ammonia, for adsorption of the ammonia, for maximum efficiency of the heat pump system. Insulation 58 should be provided around the inside of cylinder 50, to preclude heat losses arising from cyclical heating and cooling of the structure of the reactor 16 itself.

Figure 6:
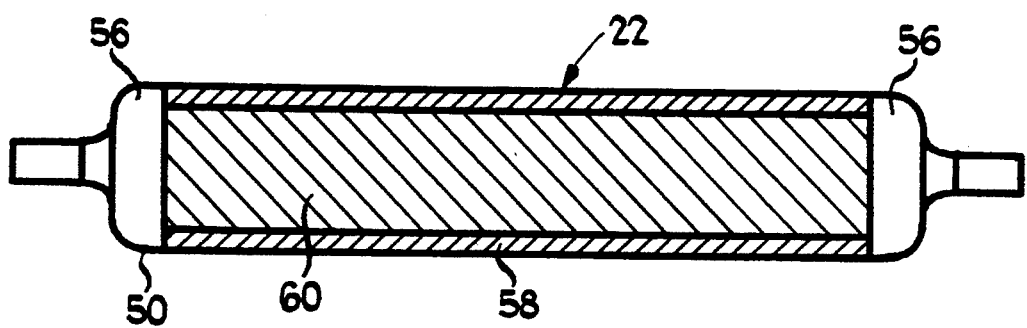
FIG. 6 is a side elevation, in section, of a schematic representation of a regenerator, in accordance with the present invention.

The construction of regenerator 22, FIG. 6, would be substantially identical to that of reactor 16, except that instead of carbon particles 52, a nonadsorbent sensible heat storage material 60 would be substituted. Possible materials would be stainless steel wool or stainless steel shot or sand, among others.

The heat pump system of the present invention is believed to have significant advantages over two reactor, or even prior single reactor systems. The use of the reactant gas to heat and cool the reactor eliminates the need for separate heat exchanger structures and increases the efficiency of the heat exchange process. The use of the regenerator provides control and preservation of the thermal waves established in the reactor, without the need for complex controls which are typical of two reactor systems. The system of the present invention can be built with conventional welding techniques, using known materials and methods of construction. The sizing and configuration of the various supporting components, can be obtained through the application of known techniques in the heating, ventilation and air conditioning art.

As an example of the operating characteristics of such a system, it is believed that for a heat pump having a 3-ton cooling capacity, the following characteristics would apply:

| | |
|---|---|
| Mass flowrate | 1845.1 (lb/hr) |
| (specific heat of 0.527 BTU/hr-°F. for ammonia) | |
| Volumetric flowrate (adsorption) | 150.00 cubic feet/minute |
| Volumetric flowrate (desorption) | 62.4 cubic feet/minute |

For a half-cycle time of 2 minutes, a mass of carbon particles for the reactor equivalent to 88 lbs. and 3.52 cubic feet would be required. For the same half-cycle time, a mass of sand (having a specific heat of 0.17 BTU/lb-°F. and a density of 103 lb/cubic foot) for the regenerator equivalent to 544.00 lbs. and 5.28 cubic feet, would be required. A coefficient of performance of 1.0 is believed to be attainable with such a system.

The foregoing description and drawings merely explain and illustrate the invention, and the invention is not limited thereto except insofar as the appended claims are so limited, as those skilled in the art who have the disclosure before them will be able to make modifications and variations therein without departing from the scope of the invention.

We claim:

1. A heat pump system for transferring heat to and/or from a location, comprising:
    a first fluid circuit including
        an adsorbent reactor operably configured to permit the passage of fluid therethrough, the at least one adsorbent reactor having a first end and a second end, the adsorbent reactor further containing therewithin an adsorbent material,
        a quantity of fluid which is capable of being adsorbed and desorbed by the adsorbent material in the at least one adsorbent reactor, the fluid further being capable of undergoing transition from a vapor phase, to a liquid phase, and from a liquid phase to a vapor phase, in the heat pump system,
        means for receiving and storing heat from the fluid, and later releasing the stored heat back to the fluid, the means for receiving and storing heat being chemically nonreactive relative to the fluid, and operably configured to permit the passage of fluid therethrough, the means for receiving and storing heat having a first end and a second end,
        means for selectively heating the fluid in the first fluid circuit, operably positioned in the first fluid circuit between the first end of the at least one adsorbent reactor, and the second end of the means for receiving and storing heat;
        means for reversibly propelling the fluid through the first fluid circuit;
    a second fluid circuit including
        means for condensing the fluid from a vapor phase to a liquid phase,
        means for receiving the condensed fluid, operably communicating with the means for condensing the fluid,
        means for evaporating the condensed fluid, from a liquid phase to a vapor phase, operably communicating with the means for receiving the condensed fluid;
    means for selectively enabling fluid communication between the first and second fluid circuits, such that when the first fluid circuit attains a pressure less than a predetermined amount, the means for selectively enabling fluid communication permits an amount of fluid vapor to be released from the second fluid circuit to the first fluid circuit, causing liquid fluid in the means for receiving the condensed fluid to change phase to vapor, enabling the second fluid circuit to absorb heat,
    and when the first fluid circuit attains a pressure greater than a predetermined amount, the means for selectively enabling fluid communication permits an amount of fluid vapor to be released from the first fluid circuit to the second fluid circuit, causing fluid vapor in the means for condensing fluid to change phase to liquid, enabling the second fluid circuit to release heat.

2. The heat pump system according to claim 1 wherein the system is operably configured such that the fluid in the first circuit is maintained continuously in a vapor phase.

3. The heat pump system according to claim 1 wherein the fluid in the first circuit is the same as the fluid in the second circuit.

4. The heat pump system according to claim 1 wherein the first fluid circuit further comprises:
    means for selectively cooling the fluid, operably disposed between the second end of the adsorbent reactor and the first end of the means for receiving and storing heat.

5. The heat pump system according to claim 1 further comprising:
    means for delivering a quantity of liquid fluid from the means for receiving fluid in the second fluid circuit and delivering the quantity of liquid fluid to the first fluid circuit at a position between the second end of the adsorbent reactor and the first end of the means for receiving and storing heat.

6. The heat pump system according to claim 1 wherein the second fluid circuit further comprises:
    a third heat-exchanging fluid circuit operably disposed in thermal communication with, but in fluid isolation from, at least one of the means for condensing the fluid and means for evaporating the condensed fluid.

7. The heat pump system according to claim 6 wherein the fluid in the third heat-exchanging fluid circuit is water and the third heat-exchanging fluid circuit is operably configured to directly heat or cool an occupied space.

8. The heat pump system according to claim 6 wherein the fluid in the third heat-exchanging fluid system is a high-performance refrigerant, such as Freon, and the third heat-exchanging fluid circuit is operably configured to directly cool an occupied space.

9. A method for operating a heat pump system having two fluid circuits, a first fluid circuit including an adsorbent reactor containing adsorbent material, a cooler, a reversible blower, a regenerator, and a heater, all connected in series in fluid communication therebetween, a second fluid circuit including a condenser, a liquid receiver, and an evaporator, all connected in series in fluid communication therebetween, the first and second fluid circuits being connected by a three-way valve leading to the evaporator, the condenser, and a point between the cooler and the blower, the method for operating a heat pump system comprising the steps of:
    a) - beginning from an initial start-up state, charging the system with refrigerant until the adsorbent material in the reactor becomes saturated with refrigerant, and refrigerant liquid condenses out of the condenser to fill the liquid receiver with a predetermined desired amount of liquid refrigerant, and refrigerant vapor pressure in the first and second fluid circuits rises to predetermined desired pressure values;

b) - actuating the heater to begin heating the refrigerant vapor in the first fluid circuit;

c) - actuating the blower to propel the refrigerant vapor around the first fluid circuit from the heater through the reactor, so as to cause desorption of refrigerant from the adsorbent material, the regenerator picking up heat from the heated refrigerant vapor;

d) - stopping the heater when the temperature of the adsorbent material in the reactor attains a predetermined desired high temperature;

e) - stopping the blower;

f) - actuating the cooler;

g) - actuating the blower to propel the refrigerant vapor in the first fluid circuit in a reverse direction, from the cooler to the adsorbent reactor, so as to cause adsorption of refrigerant by the adsorbent material, the regenerator releasing heat to the circulating refrigerant vapor;

h) - releasing refrigerant vapor from the first fluid circuit to the condenser with the valve, when the vapor pressure in the first fluid circuit exceeds a predetermined value;

i) obtaining heating from the condensing refrigerant vapor in the condenser;

j) - releasing refrigerant vapor from the evaporator in the second fluid circuit to the first fluid circuit with the valve when the vapor pressure in the first fluid circuit drops below a predetermined value, causing the vapor pressure in the second fluid circuit to drop, causing liquid refrigerant in the receiver to boil in the evaporator;

k) - obtaining cooling from the boiling refrigerant vapor in the evaporator;

l) - repeating steps b-k for as long as operation of the heat pump is desired.

* * * * *